(12) United States Patent
Levy et al.

(10) Patent No.: US 6,996,632 B2
(45) Date of Patent: Feb. 7, 2006

(54) MULTIPHASE ENCODED PROTOCOL AND SYNCHRONIZATION OF BUSES

(75) Inventors: Paul S. Levy, Chandler, AZ (US); Karl H. Mauritz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 938 days.

(21) Appl. No.: 09/885,394

(22) Filed: Jun. 19, 2001

(65) Prior Publication Data

US 2003/0014543 A1    Jan. 16, 2003

(51) Int. Cl.
G06F 15/16 (2006.01)
(52) U.S. Cl. .......................... 709/248; 709/236; 710/61
(58) Field of Classification Search ........ 709/246–248, 709/230–238; 375/219–236; 711/105; 710/309–310, 710/105–106, 60–61; 713/400–401, 500–502, 713/600–601
See application file for complete search history.

(56) References Cited

U.S. PATENT DOCUMENTS

| | | | |
|---|---|---|---|
| 5,412,697 A | | 5/1995 | Van Brunt et al. |
| 5,436,897 A | * | 7/1995 | Cook ........................ 370/212 |
| 5,619,541 A | * | 4/1997 | Van Brunt et al. .......... 375/360 |
| 5,881,247 A | * | 3/1999 | Dombrosky et al. ........ 710/100 |
| 5,964,845 A | * | 10/1999 | Braun et al. ................ 713/375 |
| 6,008,734 A | * | 12/1999 | Lowe ...................... 340/825.2 |
| 6,085,270 A | * | 7/2000 | Gulick ....................... 710/100 |
| 6,324,603 B1 | * | 11/2001 | Niizuma et al. .............. 710/72 |
| 6,338,127 B1 | * | 1/2002 | Manning .................... 711/167 |
| 6,374,360 B1 | * | 4/2002 | Keeth et al. ................ 713/400 |
| 6,404,771 B1 | * | 6/2002 | Gulick ....................... 370/442 |
| 6,426,943 B1 | * | 7/2002 | Spinney et al. ............. 370/235 |
| 6,442,644 B1 | * | 8/2002 | Gustavson et al. ......... 711/105 |
| 6,480,946 B1 | * | 11/2002 | Tomishima et al. ......... 711/167 |
| 6,594,284 B1 | * | 7/2003 | Page et al. .................. 370/508 |
| 6,665,317 B1 | * | 12/2003 | Scott ......................... 370/516 |
| 6,704,882 B2 | * | 3/2004 | Zabinski et al. ............ 713/401 |
| 6,735,709 B1 | * | 5/2004 | Lee et al. ................... 713/401 |
| 6,763,390 B1 | * | 7/2004 | Kovacevic et al. ......... 709/231 |

FOREIGN PATENT DOCUMENTS

EP          0597583 A    5/1994

OTHER PUBLICATIONS

PCT International Search Report, Sep. 10, 2002.

* cited by examiner

*Primary Examiner*—William C. Vaughn, Jr.
(74) *Attorney, Agent, or Firm*—Blakely, Sokoloff, Taylor & Zafman LLP

(57) ABSTRACT

A multiphase encoded protocol has sufficient density of commands to allow a rich language to be realized on a bus. When ten field bits are dedicated to commands, it is possible to have more than six million words to choose from per clock. Architecture to implement the multiphase encoded protocol and synchronize the bus includes an extracted clock, a command element, and a data element. One-bit multipliers are used as correlation elements to provide feedback into slaved delay-locked loop (DLL) devices, which provides precise phase alignment for successful data extraction of several channels.

12 Claims, 6 Drawing Sheets

MULTIPHASE ENCODED PROTOCOL AND SYNCHRONIZATION OF BUSES

BACKGROUND OF THE INVENTION

1. Field of the Invention

The present invention relates generally to networks. In particular, the present invention relates to network buses.

2. Background Information

A bus is generally defined as a common physical signal path that includes wires or other media (e.g., optical fiber) across which signals can be sent from one part of the network to another. One common characteristic of buses is that as the bus matures, the functions that need to be transmitted and received increase. However, any defined bus by design has an upper limit of functions that the bus can handle. Put another way, the bus may be limited in the number of words in its command/control vocabulary. The size of the command/control vocabulary tends to dictate the variety of functions the bus can handle.

Another common characteristic of buses is that operations on the buses must be synchronized for the bus to operate properly. A bus typically has three parts, a clock, data lines, and control lines. The clock gives the bus integrity, which allows the bus parts to work together as a unit. The clock may be inferred by the fundamental frequency of transmission from the command/control lines or data lines. The data lines typically carry data and the command/control lines typically carry command and control signal values.

One drawback of some existing networks is that there is a relationship between the clock and the data lines that must be maintained for the network to function as intended. This is because the clock and data on the data lines come from different sources. If any part of the bus (e.g., data on the data lines) goes faster or slower where it falls outside a window of margin that is governed by the clock edge, the bus will have errors and perhaps fail to perform its intended function. As the bus operates faster and faster, the clock in relation to the data lines and control lines can fail to perform its intended function.

Networks sometimes simultaneously transmit several channels to increase bandwidth. Channels are typically separated using different signal trace paths, wires, wavelengths, or colors (for optical transmission). It is common for one channel to take one path to a receiver while another channel takes a different path to the same receiver. Moreover, one channel's transmitter may fire at one time while another channel's transmitter may fire at a different time.

When these (and other) conditions exist (e.g., different colors, different trace paths, different transmitter firing times), the channels may be skewed at the receiver. This is because different colors may travel through the transmission media (e.g., the atmosphere, optical fiber) at different speeds or may take different paths and as a result arrive at the receiver at different times. When channels take different paths, one path may be longer or shorter than another path, or one path may be faster or slower than another path, which also means the signal values on channels may arrive at the receiver at different times. When the transmitter fires at different times the channels are launched at different times, which again means the signal values on channels may arrive at the receiver at different times. At the receiver, the conversion in the optical transducers may cause channels to be skewed as well because each optical transducer may have a different delay.

To compensate for channel skew, the receiver must synchronize the incoming channels in some manner. One current scheme to synchronize channels at the receive end involves aggregating multiple channels at a time, which each has at least one embedded clock, and connecting the aggregated lines at a register. Data is clocked into the register using a discrete clock. When the register sees that the data is settled the next data on the channels is clocked into the register. This scheme typically slows down communications, however, because the receiver must wait for all command/control information and data to be assembled before it determines the intended use of that function.

BRIEF DESCRIPTION OF THE FIGURES

The invention is best understood by reference to the figures wherein references with like reference numbers generally indicate identical, functionally similar, and/or structurally similar elements. The drawing in which an element first appears is indicated by the leftmost digit(s) in the reference number in which.

DETAILED DESCRIPTION OF THE ILLUSTRATED EMBODIMENTS

Figure 1:
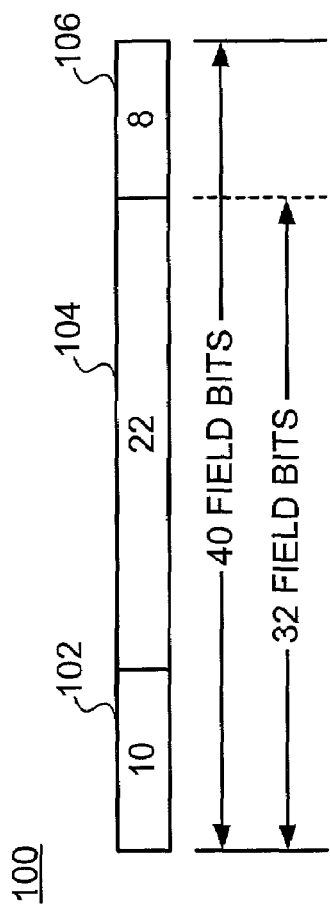
FIG. 1 is a graphical representation of an example multiphase encoded protocol according to an embodiment of the present invention.

A multiphase encoded protocol and synchronization of buses, including frames, channels, etc., implementing a multiphase encoded protocol is described herein. In the following description, numerous specific details, such as particular processes, materials, devices, and so forth, are presented to provide a thorough understanding of embodiments of the invention. One skilled in the relevant art will recognize, however, that the invention can be practiced without one or more of the specific details, or with other methods, components, etc. In other instances, well-known structures or operations are not shown or described in detail to avoid obscuring aspects of various embodiments of the invention.

Some parts of the description will be presented using terms such as bus, bits, clock, command, and so forth. These terms are commonly employed by those skilled in the art to convey the substance of their work to others skilled in the art. As used herein, the word "line" refers to a single line having a multiphasic property. according to an embodiment, a multiphasic property is a condition in which a single line is made up of two or more data field bits with one or more command/control field bits in a sequence. Per line, either a data field bit or a command/control field bit is defined not both at the same time. For a bus, if any line has a command/control field bit set, then all the information on the bus defines a command.

Other parts of the description will be presented in terms of operations performed by a network, using terms such as encoding, receiving, transmitting, and so forth. As is well understood by those skilled in the art, these quantities and operations take the form of electrical, magnetic, or optical signals capable of being stored, transferred, combined, and otherwise manipulated through mechanical and electrical components of a network; and the term "network" includes general purpose as well as special purpose data processing machines, systems, and the like, that are standalone, adjunct or embedded.

Various operations will be described as multiple discrete steps performed in turn in a manner that is most helpful in understanding the invention. However, the order in which they are described should not be construed to imply that these operations are necessarily order dependent or that the operations be performed in the order in which the steps are presented.

Reference throughout this specification to "one embodiment" or "an embodiment" means that a particular feature, structure, process, step, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The present invention is directed to a multiphase encoded protocol, which as the number of lines on a bus implementing the protocol increases, the number of command/control words increases exponentially above the number of data words. For example, using a multiphase encoded protocol, two lines can carry sixteen ($2^4$) variations of data words and the same lines can carry twenty variations of command/control words. Ten lines can carry 1,048,576 ($2^{20}$) variations of data words and 6,553,600 or more variations of command/control words. Sixteen lines can carry 4,294,967,296 ($2^{32}$) variations of data words and 42,949,672,960 or more variations of command/control words.

There are several advantages of a multiphase encoded protocol according to embodiments of the present invention. One advantage is that the structure of data and command allows a unique signature to be part of the protocol for easy identification, which simplifies the hardware implementations and decreases network overhead. For example, the multiphase encoded protocol allows a simplified electrical to optical and optical to electrical interface to be created.

Another advantage of multiphase encoded protocol is a decreased risk of burning the optical transducer with high, narrow pulses. This is because a multiphase encoded protocol permits pulse packing in which increased information density is applied to an optical transducer.

Still another advantage to multiphase encoded protocol is that because the size of the command/control vocabulary tends to dictate the variety of functions (e.g., commands and controls) the bus can handle, a multiphase encoded protocol according to embodiments of the present invention allows new instruction sets to be created using software, which is useful for expandability purposes.

Of course, the present invention is not limited by the number of phases in multiphase encoding. For instance, Table 1 lists example numbers of lines (and field bits) and their corresponding number of command words and/or data words transferred.

TABLE 1

| Number of lines per bus | Transfer | |
| --- | --- | --- |
| | Commands | Data |
| 1 | 2 | 4 |
| 2 | 20 | 16 |
| 3 | 144 | 64 |
| 4 | 640 | 256 |
| 5 | 3,200 | 1024 |
| 6 | 15,360 | 4096 |
| 7 | 71,680 | 16384 |
| 8 | 32,7680 | 655,536 |
| 9 | >1,474,560 | 2,621,144 |
| 10 | >6,553,600 | 1,048,576 |
| 11 | >28,853,840 | 4,194,304 |
| 12 | >125,829,120 | 16,777,216 |
| 13 | >545,259,520 | 67,108,864 |
| 14 | >2,348,810,240 | 268,435,456 |
| 15 | >10,066,329,600 | 1,073,741,842 |
| 16 | >42,949,672,960 | 4,294,967,296 |

Note that the number of permutations for command/control words is much higher than the permutations for data words. Note also that 6,553,600 command/control words is more words than are currently present in the English language and that 42,949,672,960 command/control words is more words than are currently present in all existing languages combined. This density of commands allows a rich language to be realized. This richness of command/control words in a multiphase encoded protocol increases when two data field bits and two command/control field bits are used or three data field bits and three command/control field bits are used, and so on.

FIG. 1 is a graphical representation of an example multiphase encoded protocol 100 according to an embodiment of the present invention. The example protocol 100 uses forty field bits, including ten field bits ($D_0$–$D_9$) dedicated to command/control words (command/control field bits 102), twenty-two field bits (data field bits 104) dedicated to data, addressing, and/or other functions, and eight field bits dedicated to error correction (ECC field bits 106). The command/control field bits 102 hold the purpose or functional information for remaining field bits in the protocol 100. In this embodiment, with ten command/control field bits, it is possible to have 6,553,600 command/control words to choose from per clock. Forty field bits also allows four sets of (ten field bit) command/control field bits 101, which equates to four command/control words. When any field bit in the forty field bits has a command/control field bit active the entire forty field bits represent a command/control structure.

According to embodiments of the present invention, the multiphase encoded protocol 100 is a seven-phase encoded protocol. Seven-phase encoding is defined as having the possibility of two data field bits or one command/control field bit per clock edge. In seven-phase encoding, the dropping of the falling edge in relation to the rising clock edge defines the two bits of data (00, 01, 10, 11) or one command/control field bit (0 or 1). The command/control field bits 102 include $C_0,C_1$ bit definitions and the data field bits 104 are related to 00, 01, 10, 11 data field bits. All bits with $C_0$ bit set alternating with $C_1$ bit set represents IDLE mode. This allows multiphase encoding to null out bus skews. The IDLE mode includes n lines with all $C_0$ bits set followed by one or more lines with $C_1$ bit set in repeating cycles. This allows logic to be created that can null out bus skews that exceed more than one clock interval.

Of course, the present invention is not limited by the number of phases in multiphase encoding. For instance, according to other embodiments of the present invention, the multiphase encoded protocol 100 is a nine-phase encoded protocol. Nine-phase encoding is defined as having the possibility of two data field bits or two command/control field bits per clock edge. The dropping of the falling edge in relation to the rising clock edge defines the two bits of data (00, 01, 10, 11) or two bits of command (00, 01, 10, 11).

Alternatively, the multiphase encoded protocol 100 is an eleven-phase encoded protocol. Eleven-phase encoding is defined as having the possibility of three data field bits or one command/control field bit per clock edge. The dropping of the falling edge in relation to the rising clock edge defines the three bits of data (000, 001, 010, 011, 100, 101, 110, 111) or one command/control field bit (0 or 1).

Alternatively still, the multiphase encoded protocol 100 is a thirteen-phase encoded protocol. Thirteen-phase encoding is defined as having the possibility of three data field bits or two command/control field bits per clock edge. The dropping of the falling edge in relation to the rising clock edge defines the three bits of data (000, 001, 010, 011, 100, 101, 110, 111) or two bits of command (00, 01, 10, 11). Reading the description herein, it will be apparent to persons of ordinary skill in the art how to implement other multiphase encoded protocols in accordance with the present invention.

Figure 2:
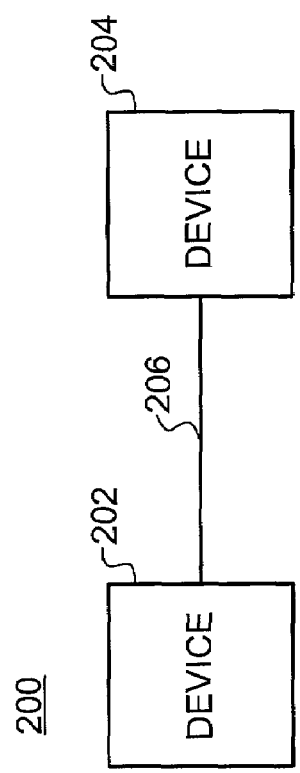
FIG. 2 is a schematic diagram of an example network suitable for implementing embodiments of the present invention.

The present invention is also directed to architecture to implement the multiphase encoded protocol and synchronize channels on a bus. FIG. 2 is a schematic diagram of an example network 200 suitable for implementing embodiments of the present invention. The example network 200 includes at least two devices (202, 204) that transmit and receive data to/from each other via a bus 206. The bus 206 is coupled between the devices 202 and 204 to permit the devices 202 and 204 to exchange data and command/control information with each other utilizing the multiphase encoded protocol 100.

In one embodiment, the devices 202 and 204 may be processors, which perform conventional functions of executing programming instructions including implementing many of the teachings of the present invention. For example, the devices 202 and 204 may be processors of the Pentium® processor family available from Intel Corporation of Santa Clara, Calif. Although only two devices (202 and 204) are shown, embodiments of the present invention may be implemented using more than two devices.

Command and/or control information may be transmitted with data at any time, which increases efficiency across the bus 206. Data and command/control information determine how the (follow-on or previous) data should be processed. When more data and command/control information are exchanged, how the (follow-on or previous) data should be processed may change.

Figure 3:
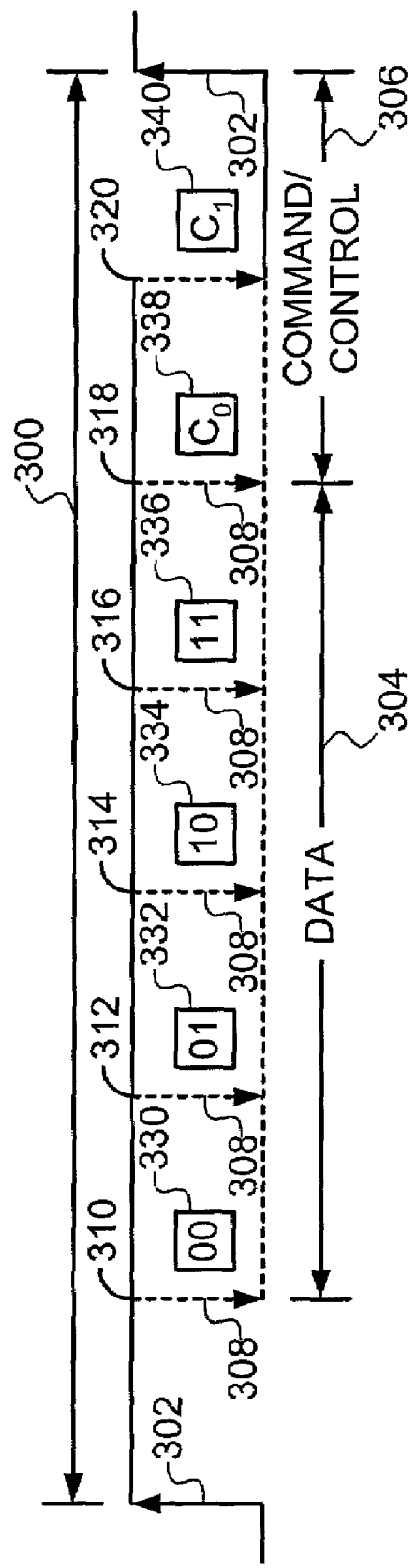
FIG. 3 is a graphical representation of a multiphase encoded frame on a line in the bus of FIG. 2 according to embodiments of the present invention.

Embodiments of the present invention synchronize frames exchanged by devices on the bus 206. FIG. 3 is a graphical representation of frame 300 transmitting on a line in the bus structure 100 using a multiphase encoded protocol according to embodiments of the present invention. In the embodiment shown, two rising edges 302, a data structure 304, at least one command/control structure 306, and at least one falling edge 308 bound the frame 300. Each rising edge 302 indicates a clock. The frame 300 (e.g. data structure 304, command/control structure 306, and clock) may be a computer data signal embodied in a carrier wave transmitted and received over the bus 206.

The command/control structure 306 in relationship to the data structure 304 defines the information on the data bus of the bus 206. The clock defines the synchronization of all lines on the bus 206. For every command/control word, the data structure 304 meaning is redefined at the time of the clock. The multiphase encoding of the waveform in the frame 300 allows multiple logical states and their function to be determined while using the initial rising edge of the waveform as the synchronizing clock.

For lines that balance the charge on a transmission line, the rising and falling edges can be reversed. For example, a command is sent to the receiver stating a reversal of rise/fall. This allows the receiver to reverse its logic also.

The relationship between clock and data can be derived and compensated for in the receiving unit. A receiving device (202, 204) uses the clock to adjust the phase of one or more incoming frames 300 to synchronize the frames 300 with each other. The clock is thus embedded in the multiphase encoded protocol.

In one embodiment, a falling edge 308 indicates that the structure that follows the falling edge 308 is a data structure 304 or a command/control structure 306. When a falling edge 308 occurs at one predetermined point (310, 312, 314, or 316) in the frame 300, the structure that follows the falling edge 308 is a data structure 304 and the information being transmitted and received is a data. When a falling edge 308 occurs at another predetermined point (318 or 320) in the frame 300, the structure that follows the falling edge 308 is a command/control structure 306 and the information being transmitted and received is command and/or control information. When a falling edge 308 occurs at the predetermined point 318, the command/control structure 306 indicates one command ($C_0$). When a falling edge 308 occurs at the predetermined point 320, the command/control structure 306 indicates another one command ($C_1$).

The data structure 304 and the command/control structure 306 each include a predetermined number of data/command/control field bit fields. Each bit field includes a predetermined number of data/command/control field bits. In one embodiment, each data structure has a D0, D1=two bits of data or one bit of command C on a two line bus. A command set in any line makes the bus a command/control function. The first line of $D_0$ is $D^1_0$ and $D_1$ is $D^1_1$. The command/control field bit is $C^1$. The second line is $D^2_0$ and $D^2_1$, and the command/control field bit is $C^2$. Then, taking the command for each line at a time with the other line two data bits at a time,:

$C^1=0$ with $D^2_0 D^2_1$ ranging from 00 to 11 of the $2^{nd}$ line=4 variation;

$C^1=1$ with $D^2_0 D^2_1$ ranging from 00 to 11 of the $2^{nd}$ line=4 variation;

$C^2=0$ with $D^1_0 D^1_1$ ranging from 00 to 11 of the $1^{st}$ line=4 variation;

$C^2=1$ with $D^1_0 D^1_1$ ranging from 00 to 11 of the $1^{st}$ line=4 variation; and $C^1=0$ $C^2=0$, $C^1=0$ $C^2=1$, $C^1=1$ $C^2=0$, $C^1=1$ $C^2=1$ is 4 variations.

In this embodiment, a total of twenty variations for command/control words and sixteen variations for data words of two lines with four bits. Of course, this concept can be extended to any bus width, as Table 1 above shows.

The data structure 304 and the command/control structure 306 also each include a predetermined number of error correction and detection (ECC) bits, which may be used for 8B/10B encoding purposes. The ECC bits may not be necessary for certain buses. Also, for 10B coding, ECC may not be required and can be used to extend the bus width.

In one embodiment, the first transfer of a frame 300 is a command/control structure 306, which may be followed by additional command/control structures to clarify any constraints on the contents of the frame 300. Packets of data structures 304, which may or may not include ECC bits, may then follow the frame 300.

Each connection to the bus 206 includes a driver and a receiver. The driver constructs the data to be transmitted into multiphase encoded frames. The drivers in the device 202 go to receivers in the device 204. The drivers in the device 204 go to receivers in the device 202. The drivers and receivers may be single ended drivers and differential receivers having a common reference line. Both drivers and receivers from in the devices 202 to 204 can reside on the same differential bus if each receiver nulls out its own driver voltage and the driver impedance is equal to the transmission line impedance.

Conventional networks may require clock extraction for each channel entering the system. Synchronization of data takes place after de-serialization. Because each channel is its own clock domain, all channels must be synchronized to some internal clock. According to embodiments of the present invention, the network 200 provides a system clock and synchronization without phase-lock loops (PLLs) or post de-serialization methods for a received data or command/control. For example, channel-to-channel synchronization is accomplished with delay-lock loop (DLL) devices that are kept in phase using one-bit multiplier flip-flops. The one-bit multiplier flip-flops are used as correlation elements that provide the feedback into slaved DLL devices. The master DLL output provides the system clock. The synchronization of each slaved DLL realized by the one-bit multiplier flip-flops permits precise phase tracking to the master DLL. All command/control structures and data structures are synchronized to the system clock.

Figure 4:
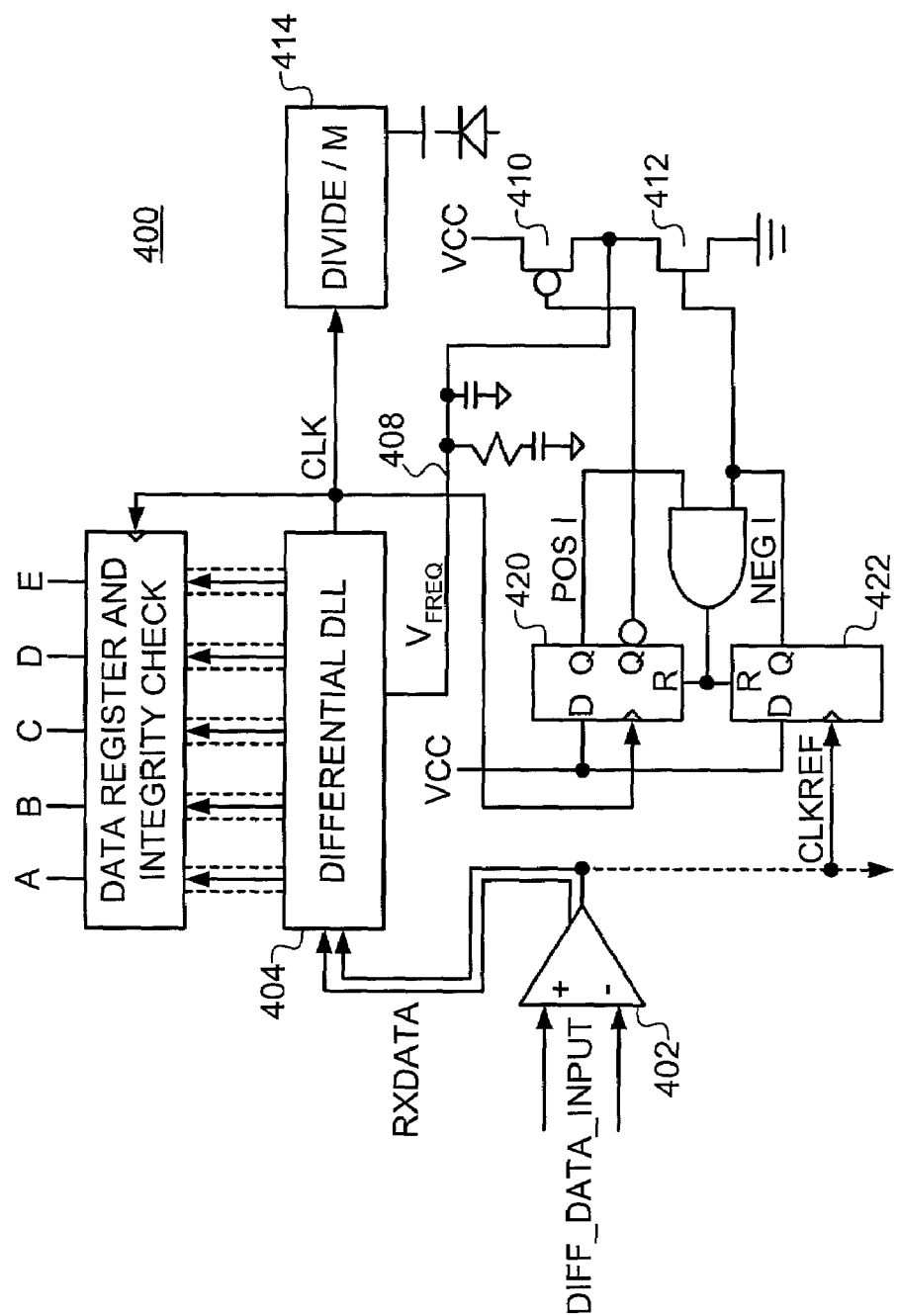
FIG. 4 is a schematic diagram of an example differential receiver according to embodiments of the present invention.

FIG. 4 is a schematic diagram of an example differential receiver 400 according to an embodiment of the present invention, in which a differential amplifier 402 extracts a common offset voltage from a differential data input through and sends the results to a differential DLL 404 and to the CLKref if it is the first line on the bus. A $V_{freq}$ voltage 408 sets itself such that the delay through the differential DLL 404 equals the period from the rising edge of the differential data input to the next rising edge of the differential data input through the charging or discharging of current steering transistors 410 and 412. The differential DLL 404 taps are in the middle of the transition periods, as shown in the diagram.

In some systems, where there is a concern of noise coupling into the differential DLL 402 and the guard rings are not sufficient, divide/m logic 414 counts down the frequency such that the BIAS current into the substrate of the differential receiver 400 is set slightly negative. This decreases the inter-chip noise pickup per DLL and PLL stage.

On the receive end, each receiver extracts its own data from the bus 206. The receiver then uses the rising edge 302 in the data as a clock edge to extract the protocol embedded data or commands. This process eliminates clock-to-data skew and jitter because the rising edge 302 was used to format the embedded data that follows the rising edge 302.

These features provide phase alignment for successful data extraction from several optical fibers. These features also allow very wide bandwidths to be achieved without the additional overhead required by conventional 8B/10B encoded systems. This is because multiple fibers to be combined onto the optical bus 206, which moves the data path bottleneck out of the data channel.

In one embodiment, the bus 206 is coupled between the devices (102, 104) to exchange data and control information in multiphase encoded frames. In this embodiment, each frame may be encoded such that multiple phases of the frame allow multiple logic states and their functions to be determined using the initial rising edge of the frame as a synchronizing clock. Each device (102, 104) encodes data prior to transmitting and decodes the encoded data upon receipt.

Each frame is bounded by any two rising edges. The rising edges generate the system clock. The timing location of a falling edge defines the contents of the frame. The frame is subdivided into data zones (e.g., six data zones). Falling edges drop in one of the data zones. The data zones are defined as 00, 01, 10, 11, Command 0, and Command 1. A falling edge is a linear progression from one state to the next state related from the rising edge (clock). A window function may be used to compensate for edge placement uncertainty.

Figure 5:
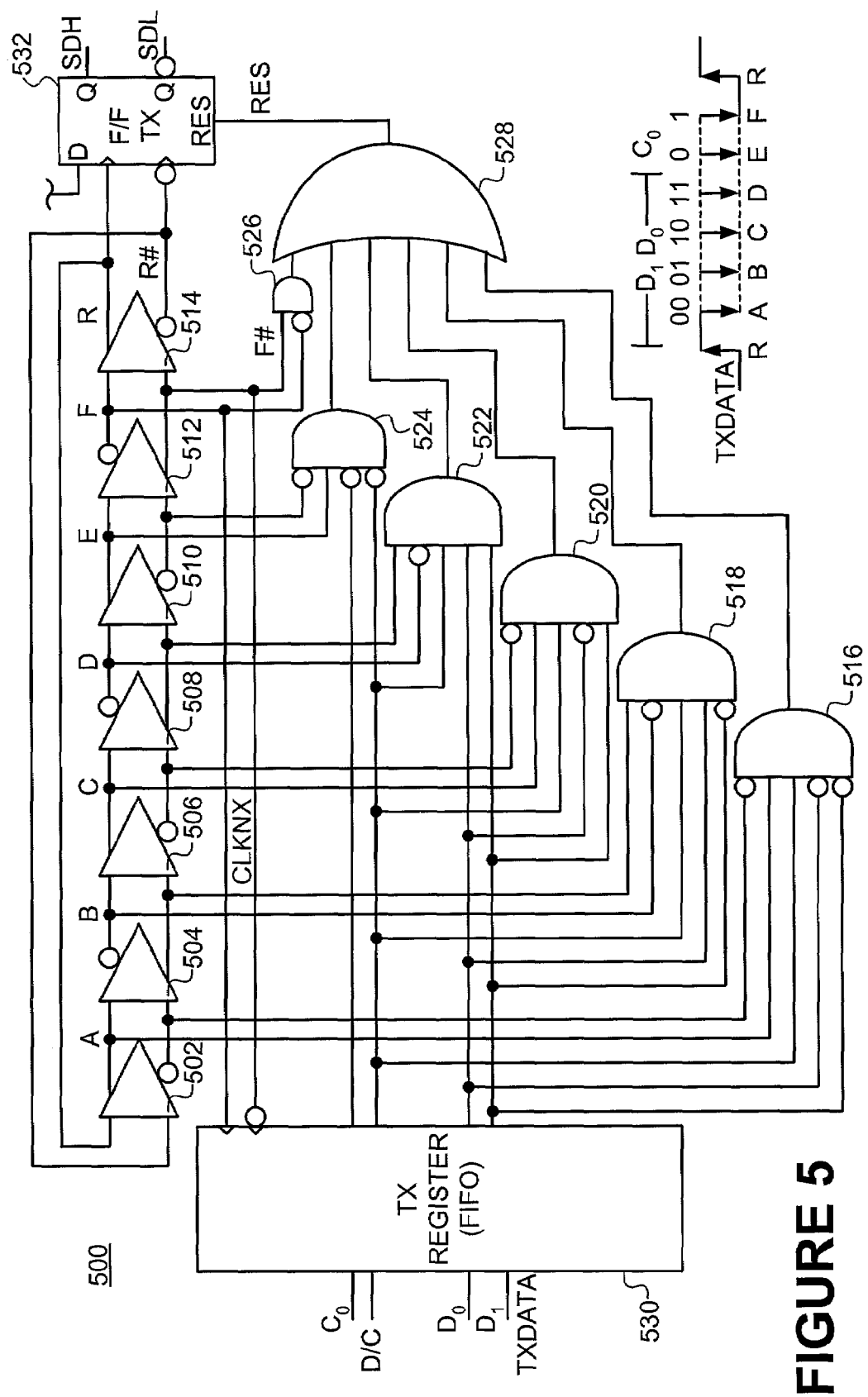
FIG. 5 is a schematic diagram of a seven-phase driver sequencer according to embodiments of the present invention.

FIG. 5 is a schematic diagram of a seven-phase driver sequencer 500 according to an embodiment of the present invention. The example driver sequencer 500 includes seven differential input/output amplifiers 502, 504, 506, 508, 510, 512, and 514, which form a seven-phase PLL to sequence data words and/or command/control words for transmission using several gates 516, 518, 520, 522, 524, 526, and 528. Data words and/or command/control words are applied to a transmit register 530. The seven phases are represented by phases A, B, C, D, E, F, and R. The R phase sets a flip-flop 532 to a high condition. The two bits of data $D_0$ and $D_1$ are used to reset the flip flop 532 at the correct phase or, if a D/C input to the transmit register 530 is set to command, then the $C_0$ bit sets the phase for command/control output.

Figure 6:
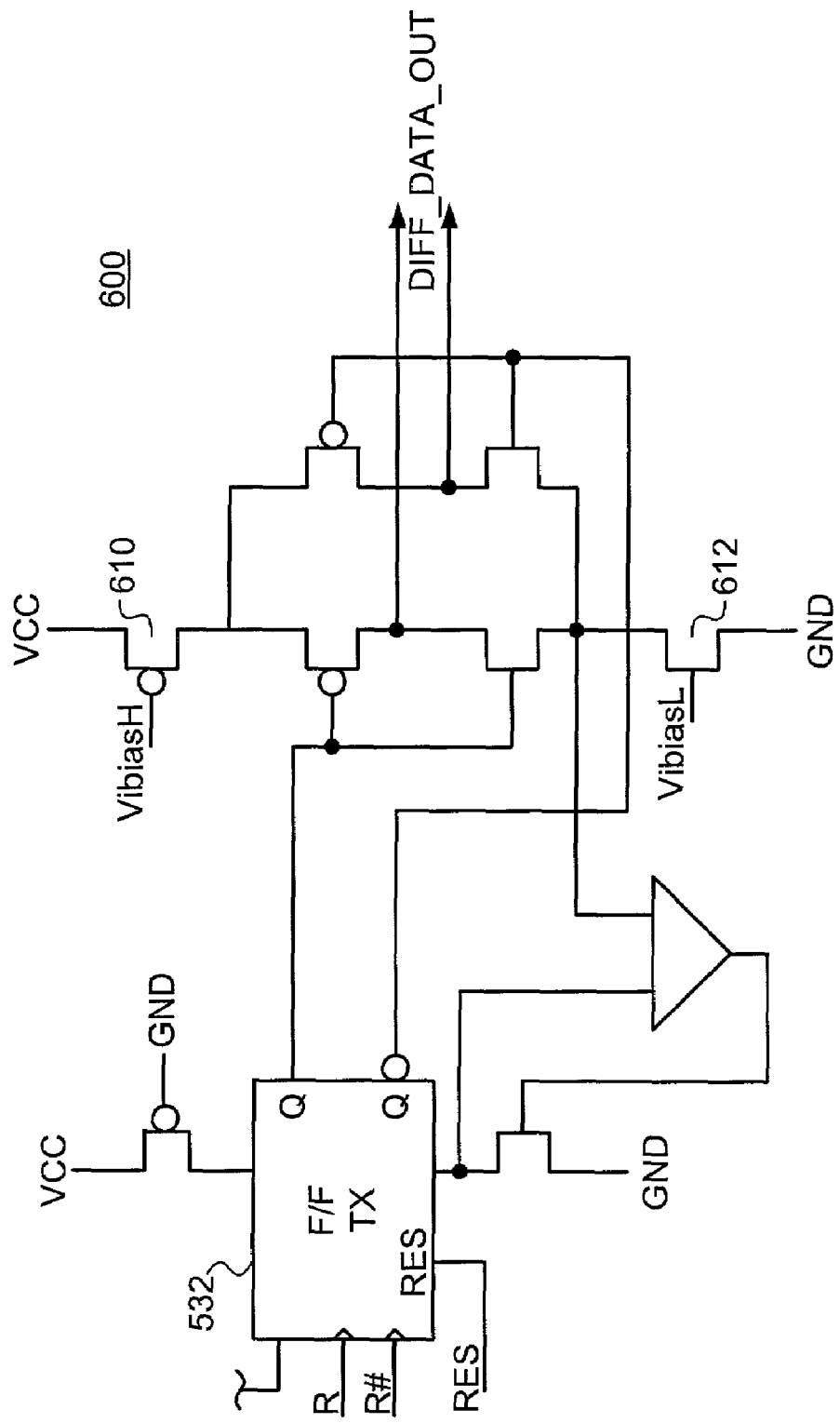
FIG. 6 is a schematic diagram of an example differential driver according to embodiments of the present invention.

FIG. 6 is a schematic diagram of an example differential driver 600 according to an embodiment of the present invention. The driver sequencer 500 output is sent to the differential driver 600, which outputs the multiphase encoded frame(s) onto the bus with the same impedance as the physical bus. The low drive voltage of the flip-flop 532 is at the same potential as the differential driver 600 voltage $V_{CC}$. This allows the differential driver 600 not to be saturated for faster output characteristics. The VibiasH and the VibiasL coupled to the transistors 610 and 612, respectively, are derived from an external resistance (not shown) that have characteristic board impedance values.

Figure 7:
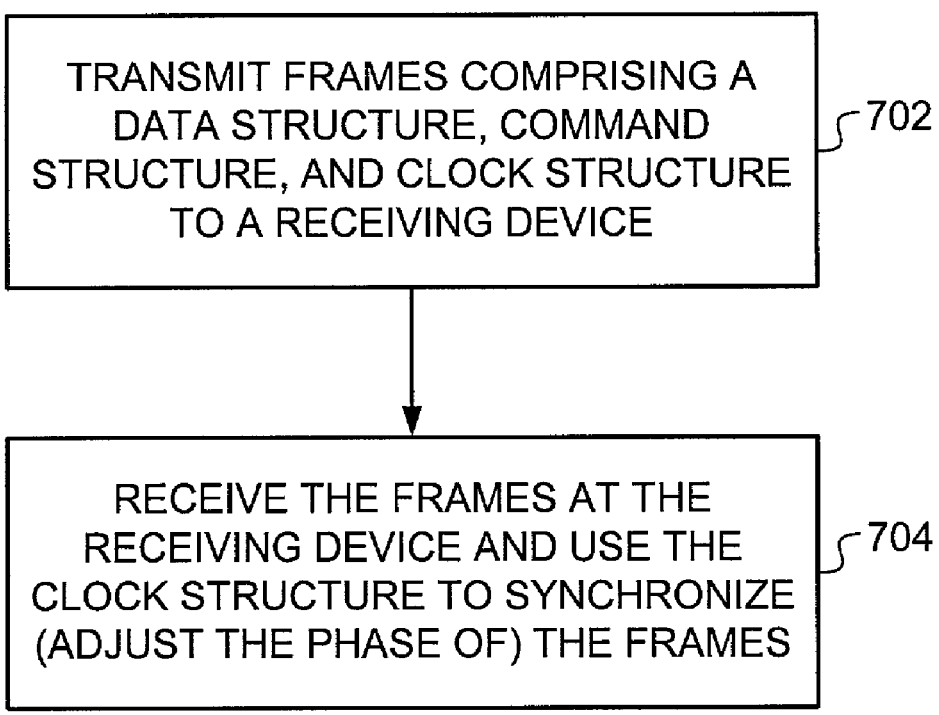
FIG. 7 is a flowchart illustrating a method for implementing optical bus synchronization according to embodiments of the present invention

FIG. 7 is a flowchart illustrating a method 700 for implementing optical bus synchronization according to embodiments of the present invention. Step 702 transmits frames comprising a data structure, command structure, and a clock structure to a receiving device. The data structure may be encoded with a predetermined number of data field bits and command structure may be encoded with a predetermined number of command/control field bits. The frame may include rising edges and falling edges. The falling edges may indicate that what follows a particular falling edge is either a data structure or a command structure such that dropping the falling edge at one predetermined point in the frame indicates that what follows is a data structure and at another predetermined point. The rising edges indicate the clock structure.

Step 704 receives the frames and used the clock to synchronize the frames with each other. A receiver may extract its data from the frame and use the rising as a clock edge to extract embedded data or command/control information.

The multiphase encoded protocol and synchronization of bus channels may be implemented on a variety of buses. For example, multiphase encoded protocol and synchronization of bus channels may be implemented on an optical bus, a communications bus, a test bus, and the like. After reading the description herein, persons of ordinary skill in the art would readily recognize how to implement a multiphase encoded protocol and how to synchronize bus channels on these buses.

Aspects of the invention can be implemented using hardware, software, or a combination of hardware and software. Such implementations include state machines, a field programmable gate array (FPGA), a microprocessor, an application specific integrated circuit (ASIC), discrete medium scale integrated (MSI) circuits, analog circuitry, etc. In implementations using software, the software may be stored on a computer program product (such as an optical disk, a magnetic disk, a floppy disk, etc.) or a program storage device (such as an optical disk drive, a magnetic disk drive, a floppy disk drive, etc.).

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

What is claimed is:

1. A network, comprising:
   at least one transmitting device and at least one receiving device; and
   a bus coupled to between the devices to exchange frames, wherein each frame is to include a data structure, at least one control structure, and a clock structure, and wherein a rising edge of each frame is to indicate the clock structure and a falling edge of each frame is to indicate that a structure that follows the falling edge of the frame is the data structure or the command structure, and wherein any receiving device in a set of devices is coupled to use a clock structure to adjust each phase of one or more of the frames to synchronize the frames with each other,
   wherein the falling edge of the frame occurring at one predetermined point in the control structure is to indicate a first command word and the falling edge of the frame occurring at a second predetermined point in the control structure is to indicate a secondary set of command words, and wherein the falling edge of the frame occurring at one predetermined point in the data structure indicates a first data word and the falling edge of the frame occurring at a second predetermined point in the data structure indicates a secondary set of data words, and wherein the secondary set of command words is greater than the secondary set of data words.

2. The network of claim 1 wherein the data structure comprises a predetermined number of encoded data field bits.

3. The network of claim 1 wherein the command structure comprises a predetermined number of encoded command/control field bits.

4. The network of claim 1 wherein the falling edge of the frame occurring at one predetermined point in the control structure indicates a first command and the falling edge of the frame occurring at a second predetermined point in the control structure indicates a secondary set of commands.

5. A method for processing data in a network, comprising:
   transmitting computer data signals embodied in carrier waves from a transmitting device to a receiving device, wherein each computer data signal is to include a data structure embodied in an encoded frame, at least one control structure embodied in the encoded frame, and a clock structure embodied in the encoded frame, and wherein a rising edge of the encoded frame is to indicate the clock structure and a falling edge of the frame is to indicate whether what follows the falling edge of the frame is the data structure or the command structure; and
   receiving the computer data signals at the receiving device and using the clock to adjust the phase of the frames to synchronize the frames with each other,
   wherein transmitting computer data embodied in carrier waves from a transmitting device to a receiving device comprises:
     dropping the falling edge of the frame at one predetermined point in the control structure to indicate a first command word and at a second predetermined point in the control structure to indicate a secondary set of command words; and
     dropping the falling edge of the frame at one predetermined point in the data structure to indicate a first data word and at a second predetermined point in the data structure indicates a secondary set of data words, and wherein the secondary set of command words is greater than the secondary set of data words.

6. The method of claim 5 wherein transmitting computer data signals embodied in carrier waves from a transmitting device to a receiving device comprises encoding the data structure with a predetermined number of data field bits.

7. The method of claim 5 wherein transmitting computer data signals embodied in carrier waves from a transmitting device to a receiving device comprises encoding the command structure with a predetermined number of command/control field bits.

8. The method of claim 5 wherein transmitting computer data signals embodied in carrier waves from a transmitting device to a receiving device comprises dropping the falling edge of the frame at one predetermined point in the control structure to indicate a first command and at a second predetermined point in the control structure to indicate a secondary set of commands.

9. A network, comprising:
   at least one transmitting device and at least one receiving device; and
   a bus coupled to between the devices to exchange frames, wherein each frame is to include a data structure, at least one control structure, and a clock structure, and wherein a rising edge of each frame is to indicate the clock structure and a falling edge of each frame is to indicated that a structure that follows the falling edge of the frame is the data structure or the command structure, and wherein any receiving device in a set of devices is coupled to use a clock structure to adjust each phase of one or more of the frames to synchronize the frames with each other,
   wherein the falling edge of the frame occurring at one predetermined point in the control structure is to indicate a first command word and the falling edge of the frame occurring at a second predetermined point in the control structure is to indicate a secondary set of command words, and wherein the falling edge of the frame occurring at one predetermined point in the data structure indicates a first data word and the falling edge of the frame occurring at a second predetermined point in the data structure indicates a secondary set of data words, and wherein the secondary set of command words is greater than the secondary set of data words.

10. The network of claim 9 wherein the data structure comprises a predetermined number of encoded data field bits.

11. The network of claim 9 wherein the command structure comprises a predetermined number of encoded command/control field bits.

12. The network of claim 9 wherein the falling edge of the frame occurring at one predetermined point in the control structure indicates a first command and the falling.

* * * * *

UNITED STATES PATENT AND TRADEMARK OFFICE
CERTIFICATE OF CORRECTION

PATENT NO. : 6,996,632 B2
APPLICATION NO. : 09/885394
DATED : February 7, 2006
INVENTOR(S) : Levy et al.

It is certified that error appears in the above-identified patent and that said Letters Patent is hereby corrected as shown below:

In column 12, at line 6, after "falling" insert --edge of the frame occurring at a second predetermined point in the control structure indicates a secondary set of commands--.

Signed and Sealed this

Twenty-seventh Day of November, 2007

JON W. DUDAS
*Director of the United States Patent and Trademark Office*